(12) United States Patent
Eddahabi et al.

(10) Patent No.: US 8,601,540 B2
(45) Date of Patent: Dec. 3, 2013

(54) SOFTWARE LICENSE MANAGEMENT

(75) Inventors: Rachil Eddahabi, La Gaude (FR); Jean-Christophe Laurentin, Cagnes sur Mer (FR); Arnaud Lund, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/851,536

(22) Filed: Aug. 5, 2010

(65) Prior Publication Data

US 2011/0083177 A1 Apr. 7, 2011

(30) Foreign Application Priority Data

Oct. 7, 2009 (EP) .................................... 09305950

(51) Int. Cl.
*H04L 9/32* (2006.01)
(52) U.S. Cl.
USPC ........................ 726/2; 726/3; 726/4; 726/19
(58) Field of Classification Search
USPC ........................ 726/21, 2–7, 16–19, 26–30; 713/165–168; 705/57–59
See application file for complete search history.

(56) References Cited

U.S. PATENT DOCUMENTS

| 5,260,999 | A | 11/1993 | Wyman |
| 6,915,278 | B1 | 7/2005 | Ferrante et al. |
| 7,231,370 | B1 | 6/2007 | Kapur |
| 2004/0010440 | A1 | 1/2004 | Rohan et al. |
| 2005/0049973 | A1 | 3/2005 | Read et al. |
| 2006/0123484 | A1* | 6/2006 | Babic et al. ..................... 726/26 |
| 2007/0150417 | A1* | 6/2007 | Hu ................................. 705/59 |
| 2008/0005787 | A1 | 1/2008 | Aldred |
| 2008/0083025 | A1* | 4/2008 | Meijer et al. ..................... 726/9 |
| 2008/0244754 | A1* | 10/2008 | Curren ............................ 726/27 |

* cited by examiner

*Primary Examiner* — Hosuk Song
(74) *Attorney, Agent, or Firm* — Law Offices of Ira D. Blecker, P.C.

(57) ABSTRACT

Disclosed is a system and method for automatically managing software licenses that are specifically tied to end users. A repository located on an authentication and license checking server contains the license requirements needed for each application. The repository is searched to determine which license(s) the requester needs to get access to an application. A user authentication is combined with a license checking at the server to grant or deny access to the application. A procurement license server may also be coupled to the license authentication and checking server to order any missing license(s).

15 Claims, 7 Drawing Sheets

SOFTWARE LICENSE MANAGEMENT

The exemplary embodiments relate generally to software asset management and more particularly to a system and method for software license management.

BACKGROUND

Most commercial software is available for end users with a license agreement. In the license agreement between the proprietor of the software (the "licensor") and the end user or organization (the "licensee"), the licensor gives permission to the licensee to use the software under certain limitations, which are set forth in the license agreement.

Some server products require that all clients that connect to the server applications have a license to connect to and use the services of that software. Some server products require one license per concurrent connection, whereby one license is required for each unique client connection at any point in time. On the other side, some server products require a license for each unique client regardless of how many will be connecting at any single point in time.

Usually, server software includes a small number of licenses, and this allows the software to be used by a few clients. If more connections to the server are needed, then additional licenses must be purchased.

Some licenses are electronically enforced. The server refuses to service clients if there are not enough licenses to cover them all. The server does not service clients unless there are valid licenses installed, and the server authenticates and serves the number of valid clients licensed. Once that number is met, the server may accept a small number of additional connections and then warn administrators before refusing to serve further connections until additional licenses are installed.

Then, in order to ensure correct number of licenses have been purchased to legally have all clients being served by a server, some licenses are assigned to end users. The Client Access License (CAL) of Microsoft Corporation is such a well known license which legally permits client computers to connect to Microsoft server software.

In large business organizations, there is the need to maintain auditable records of license assignments. Failure to do so may result in lawsuits and penalties from licensors.

BRIEF SUMMARY

Accordingly, exemplary embodiments provide a system and a method for managing software licenses.

The exemplary embodiments further provide a system and method for tracking software licenses compliance to end user usage.

Exemplary embodiments provide a license management system that assigns licenses with regard to the end user generating requests.

Exemplary embodiments further provide a license management system that allows maintaining auditable records of license assignments to determine if the overall organization is overlicensed or under-licensed for software titles.

A system and method for automatically managing software licenses that are specifically tied to end users is provided. A repository located on an authentication and license checking server contains the license requirements needed for each application. The repository is searched to determine which license(s) the requester needs to get access to an application. A user authentication is combined with a license checking at the server to grant or deny access to the application. A procurement license server may also be coupled to the license authentication and checking server to order any missing license(s).

In a preferred embodiment, a computer implemented method of managing software licenses includes requesting a login user identifier in response to receiving a request by a user to access a software resource. The login user identifier is received. To authenticate the user, the received login user identifier is then compared to stored login users identifiers. At least one software license required to entitle access to the software resource is identified and then compared to stored software licenses, each stored software license being assigned to one or more login user identifiers. The user is granted access to the software resource if the at least one software license is retrieved as assigned to the login user identifier.

Further aspects of the invention will now be described, by way of preferred implementation and examples, with reference to the accompanying Figures.

BRIEF DESCRIPTION OF THE SEVERAL VIEWS OF THE DRAWINGS

The features and advantages of the exemplary embodiments will be better understood by reading the following more particular description in conjunction with the accompanying drawings wherein.

DETAILED DESCRIPTION

Exemplary embodiments of the invention are described herein by way of examples with reference to the accompanying Figures.

Figure 1:
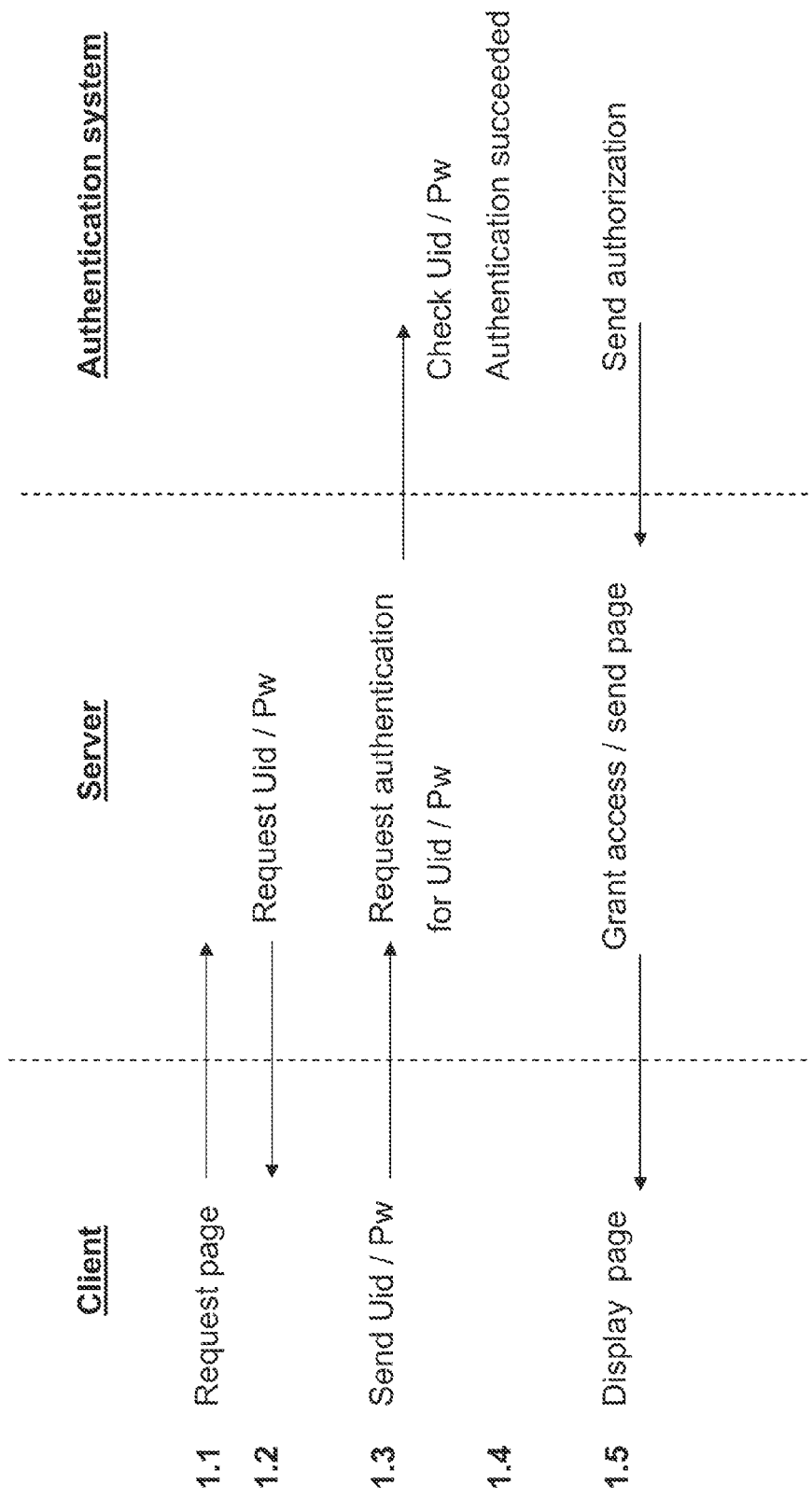
FIG. 1 depicts a flow chart of a prior art authentication process granting access.

FIG. 1 depicts the steps performed in a standard application authentication process when access is granted. In step 1.1, a user working on a client application (e.g. a web browser) is sending a request access to access a given application (e.g. a web page) that requires authentication. To authenticate the user the application sends back a prompt for user id (Uid) and password (PW) (step 1.2). In a next step (1.3) the user sends back the required information and the application forwards it to an authentication module (e.g. a LDAP server) for verification. The authentication module looks up its tables and if the password matches the user id record already stored (step 1.4), then the authentication module sends back an authorization, and the application grants the user access to the application (step 1.5).

Figure 2:
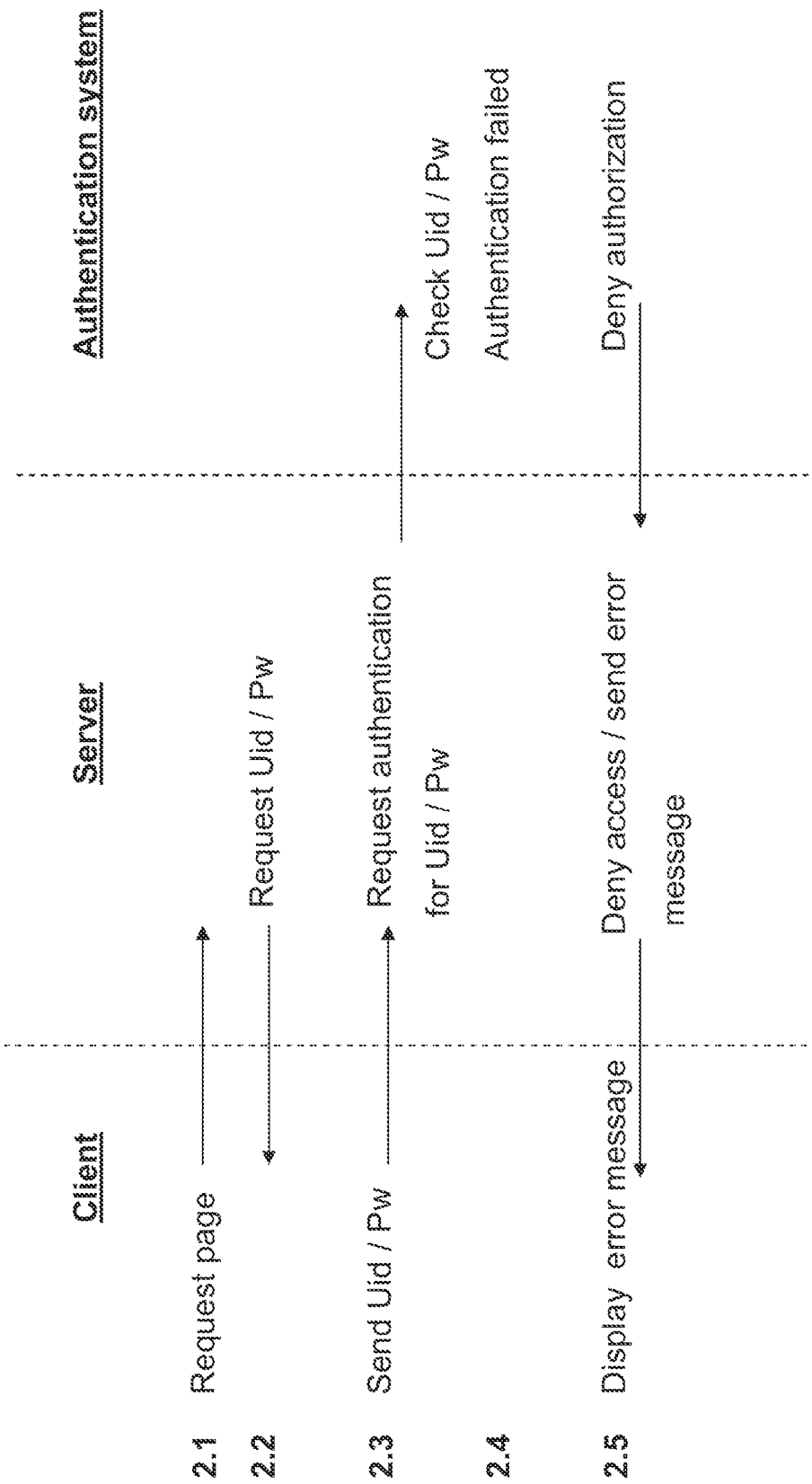
FIG. 2 depicts a flow chart of a prior art authentication process denying access.

FIG. 2 depicts the steps performed in a standard application authentication process when access is denied. Steps 2.1 to 2.3 are identical to steps 1.1 to 1.3 of FIG. 1. On step 2.4, the authentication module looks up its tables but the user id and password provided by the user do not match any record contained in the authentication module. The authentication module then denies authorization and the application sends back an error message to the client machine of the user (step 2.5).

Figure 3:
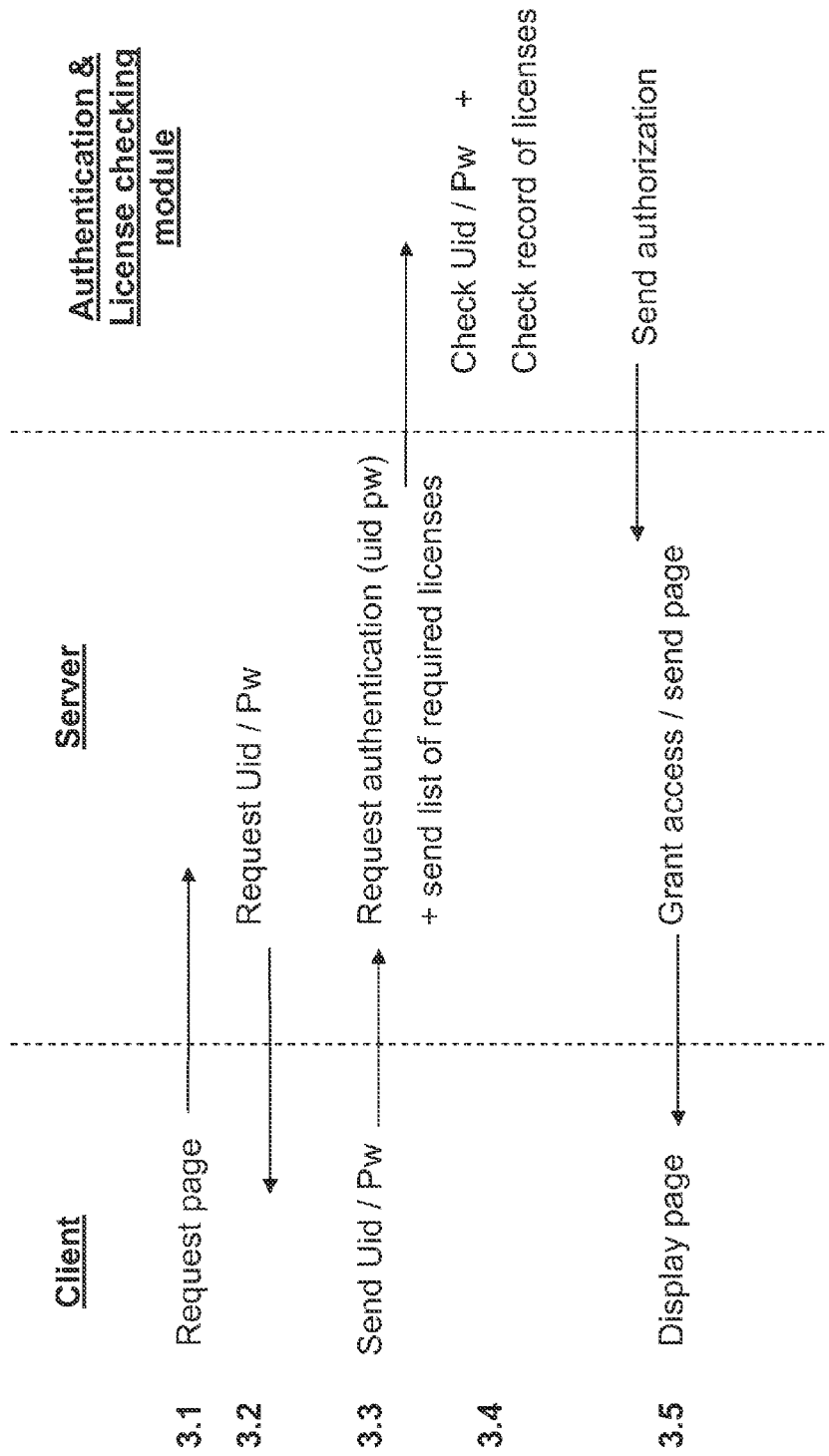
FIG. 3 shows the steps to operate the authentication and license module in a preferred exemplary embodiment.

Referring now to FIG. 3, the steps performed by the exemplary embodiments are now described. The process starts on step 3.1 from a client computer. A user working on a client application (e.g. a web browser) is requesting access to a server application (e.g. a web page) that requires a user to be compliant with some licensing rules when executing the application. On step 3.2, the application sends back to the client computer a prompt for user id and password to first authenticate the user.

On next step 3.3, the user sends the required information to the server. As the server application also requires that the user owns some licenses to be compliant with the licensing rules of the application, the list of the required licenses is sent simultaneously with the received user id and password to an "authentication and license" checking module.

On step 3.4, the "authentication and license" checking module first authenticates the user by checking the password and user id against its records. If authentication succeeds, the "authentication and license" checking module retrieves from its tables the list of the licenses on which this user is assigned, and compares it with the list sent by the application.

If all required licenses match against licenses owned by the user, then on step 3.5 the "authentication and license" checking module sends back to the application server an access authorization, and the application grants the user access to the requested application. If all required licenses do not match against licenses owned by the user, then on step 3.5 the "authentication and license" checking module may send back to the application server that access is denied and the application server may not grant the user access to the requested application.

Figure 4:
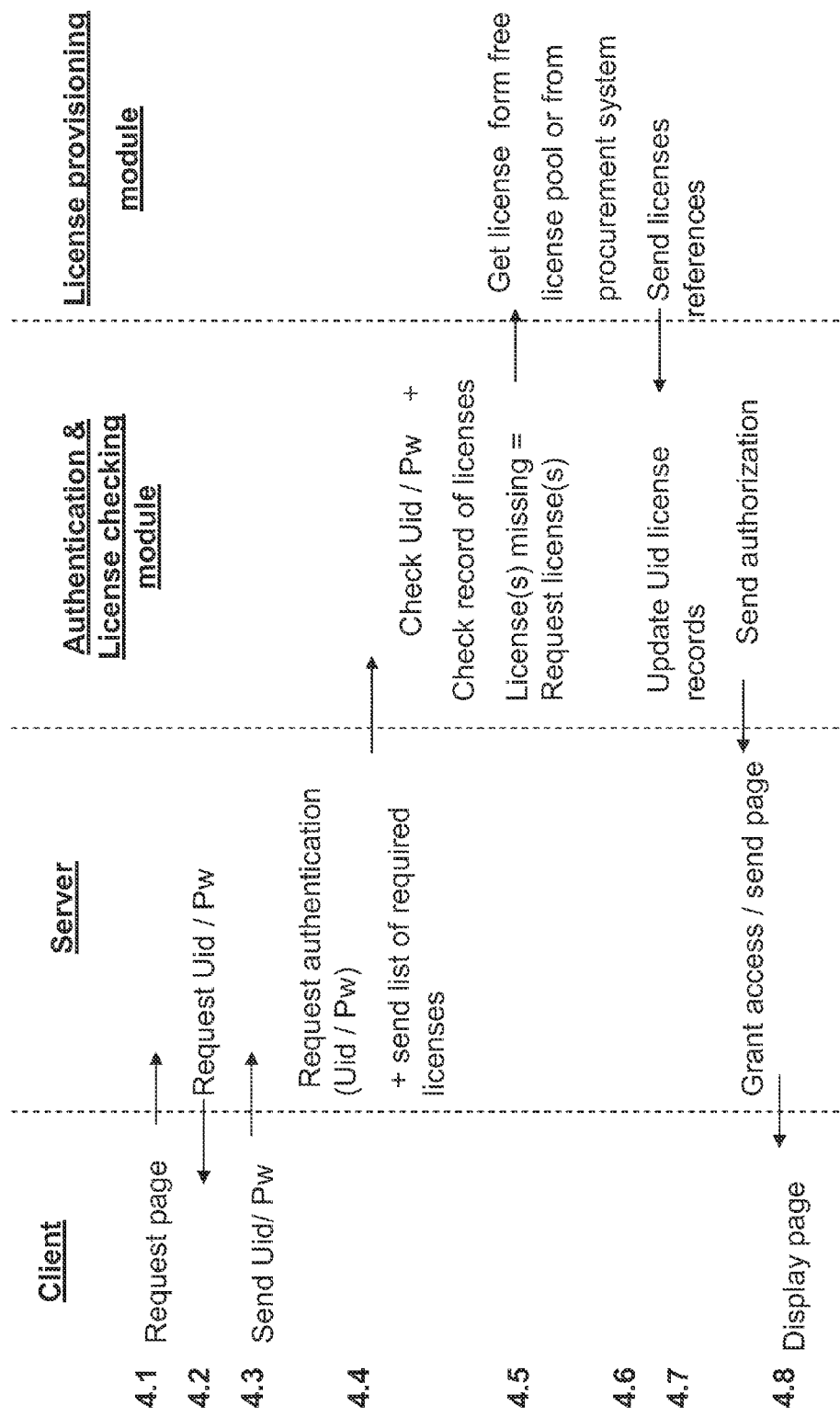
FIG. 4 shows the steps to operate the provisioning module in a preferred exemplary embodiment.

FIG. 4 depicts an exemplary embodiment when the "authentication and license" checking module is coupled to a "license provisioning" module. The process described with reference to FIG. 4 illustrates a case when a user does not have all required licenses when sending a request. The "license provisioning" module allows managing a pool of free licenses and/or is a module that is able to initialize license procurement. The "license provisioning" module is able to send back a requested license (i.e. license references which prove that the license has been acquired) whenever requested to do so or send back a message informing that the requested license is not available. The "license provisioning" module is further able to store records to keep track that a license sent is in use and is no longer free.

On step 4.1 a user working on a client application (e.g. a web browser) sends a request to a server to access a given application (e.g. a web page). As the application requires authentication, a prompt for user id and password is sent back to the user (step 4.2). Once the user sends back the requested information on step 4.3, the application which also requires that the user owns some licenses to be compliant with licensing rules when executing the application (e.g. the application requires a user CAL) sends the list of licenses required along with the user id and password to the "authentication and license" checking module on step 4.4.

Also on step 4.4, the "authentication and license" checking module first authenticates the user by checking the given password and user id against its records. If authentication succeeds the list of licenses that the user is assigned is retrieved from the existing tables, and compared to the list received from the application.

If the "authentication and license" checking operation identifies that this user does not own all required licenses, a message requesting the missing licenses, either one or several, is built and send to the "license provisioning" module (step 4.5).

On step 4.6, the "license provisioning" module retrieves the missing licenses either from the pool of free licenses or by requesting the missing licenses through the procurement system. The respective licenses are recorded for auditability purposes and marked as being "in use".

On step 4.7, the "license provisioning" module sends back the license references to the "authentication and license" checking module which is able to update the userid records by adding the new licenses to the list of license owned by this user id.

Finally, on step 4.8, the "authentication and license" checking module sends back an authorization to the application which will in turn grant access to the user.

Figure 5:
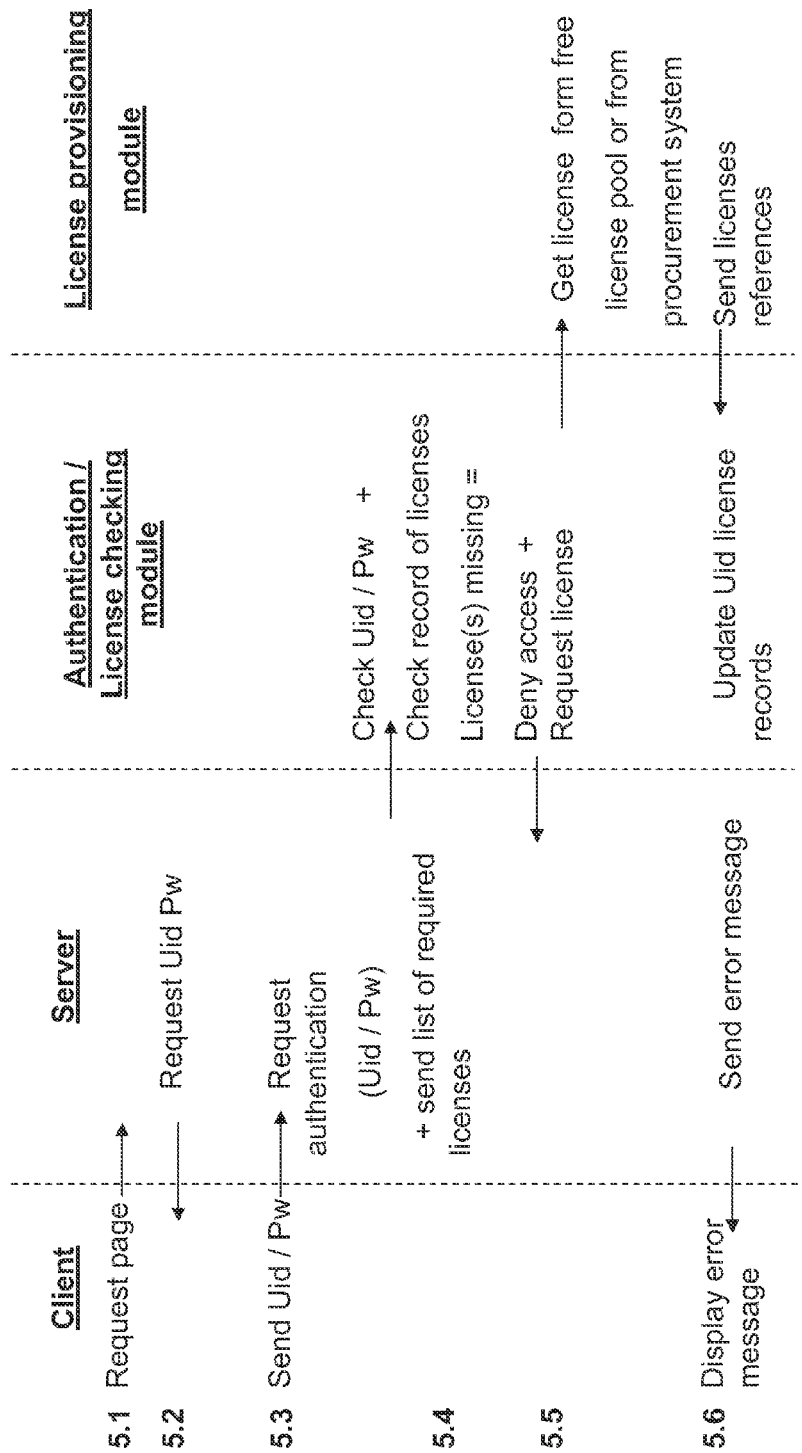
FIG. 5 depicts an asynchronous mode of the process of the exemplary embodiments.

FIG. 5 shows an alternate exemplary embodiment illustrating an asynchronous mode implementation. The process depicted in FIG. 5 is suitable when the degree of automation of the procurement system and the expected delays for the license procurement may be variable.

Steps 5.1 to 5.4 are identical to the steps 4.1 to 4.4 of FIG. 4 and are not described again here. In step 5.5, after acknowledging that one or several licenses are missing, the "Authentication and License" checking module sends back a deny access to the requester. Simultaneously, the "Authentication and License" checking module sends a request to the "license provisioning" module to request the missing license(s). The "license provisioning" module retrieves the missing licenses either from the pool of free licenses or by requesting the missing licenses through the procurement system. The respective licenses are recorded for auditability purposes and marked as being "in use".

On step 5.6, the "license provisioning" module sends back the license references to the "authentication and license" checking module which is able to update the user id records by adding the new licenses to the list of licenses owned by this user id.

It is to be noted that the records of the "license provisioning" module and of the "authentication and license" checking module are updated asynchronously.

On a further identical request received by the same user, the corresponding license(s) will be identified in the "Authentication and License" module and the process will run as for the one described with reference to FIG. 3.

Figure 6:
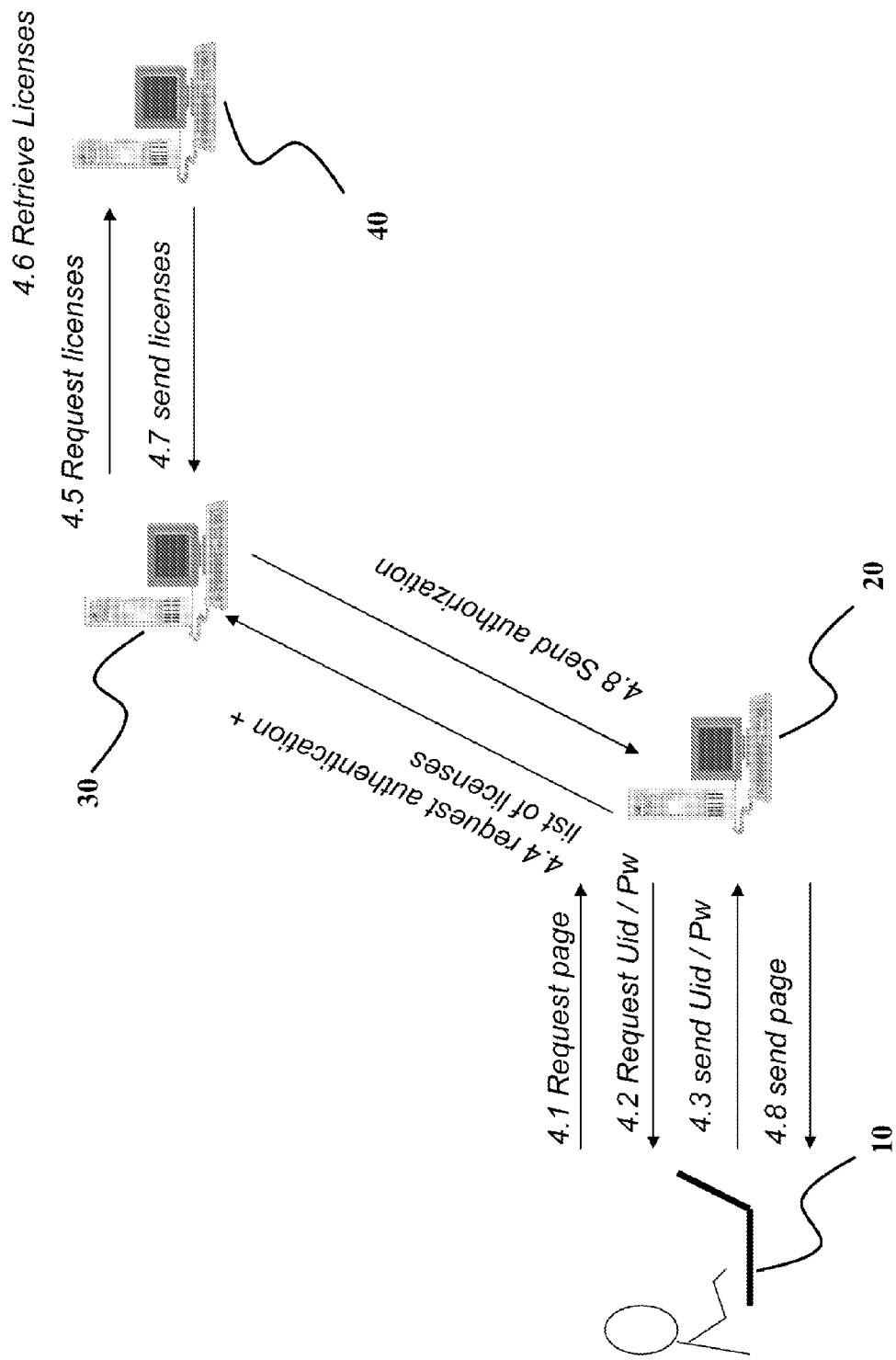
FIG. 6 is a schematic block diagram of a preferred environment to operate the method of the exemplary embodiments.

Referring now to FIG. 6, there is depicted a schematic block diagram of a preferred environment to operate the exemplary embodiments of the method. The steps of FIG. 4 are used for illustration purposes.

Reference numeral (10) shows a computer machine from which a user request is send to a server (20). The computer machine may be any computer workstation running a browser. The server (20) may be any local or remote computer server (e.g. a web server) running an application that due to its software configuration requires the end user to own one or several software license(s) in order to be authorized to use the application. Even if the end user is not aware of such client access license requirement, the advantage of the exemplary embodiments, operating at a server, is to be fully transparent for the end user and to render the use of the application compliant with the legal conditions.

An "Authentication and License" checking module on server (30) is coupled to the application server (20). The "Authentication and License" checking module on server (30) includes means to perform authentication operations in standard mode, and includes means to perform the checking operations of compliance between the user identifiers and the license(s) assigned to this user. The "Authentication and License" checking module on server (30) maintains a list of user identifiers and for each respective user a list of license(s) he/she owns. The "Authentication and License" checking module on server (30) receives from the application server (20), a list of the required license(s) associated to a user identifier and controls within its stored records if the corresponding user is already entitled to the required license(s).

In a preferred embodiment, the "Authentication and License" checking module on server (30) may be further coupled to a "License Provisioning" module on server (40). Upon request from the "Authentication and License" checking module on server (30), the "License Provisioning" module on server (40) sends back the required license(s).

Figure 7:
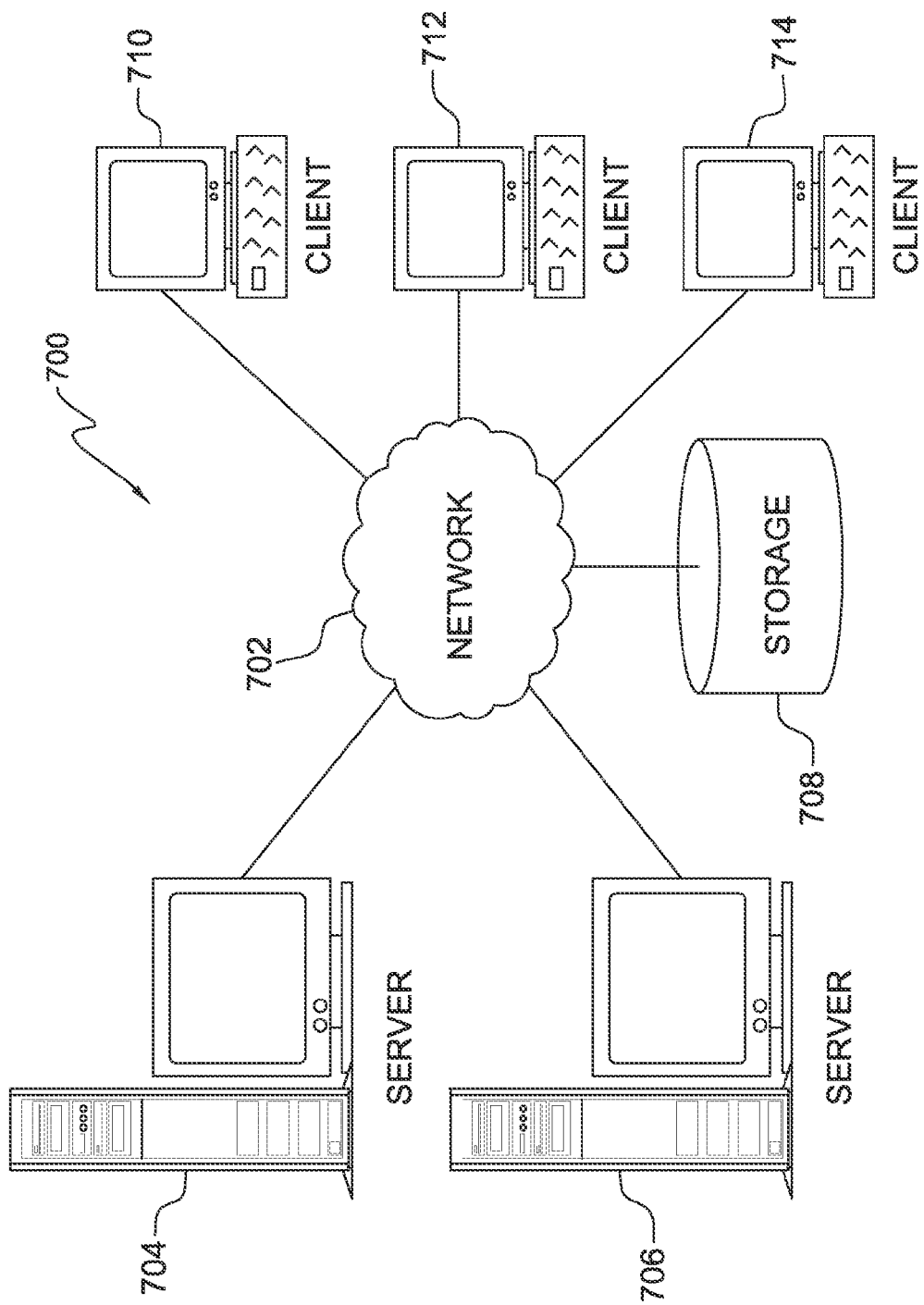
FIG. 7 illustrates a network of data processing systems in which aspects of the exemplary embodiments may be implemented.

With reference now to FIG. 7 a pictorial representation of a network of data processing systems in which aspects of the exemplary embodiments may be implemented is described. Network data processing system 700 is a network of computers in which exemplary embodiments of the present invention may be implemented. The computers may include microprocessor means, random access memory (RAM), read-only memory (ROM) and other components. Resident in the computers, or peripheral to them, may be a storage device of some type such as a hard disk drive, floppy disk drive, CD-ROM drive, tape drive or other storage device. Network data processing system 700 contains network 702, which is the medium used to provide communications links between various devices and computers connected within network data processing system 700. Network 702 may include connections, such as wire, wireless communication links, or fiber optic cables.

In the depicted example, server 704 and server 706 connect to network 702 along with storage unit 708. In addition, clients 710, 712, and 714 connect to network 702. These clients 710, 712, and 714 may be, for example, personal computers or network computers. In the depicted example, server 704 provides data, such as boot files, operating system images, and applications to clients 710, 712, and 714. Clients 710, 712, and 714 are clients to server 704 in this example, but may also be clients to server 706 to request access to applications. Network data processing system 700 may include additional servers, clients, and other numerous devices not shown.

In the depicted example, network data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems. Of course, network data processing system 700 also may be implemented as a number of different types of networks, such as for example, an intranet, a local area network (LAN), or a wide area network (WAN). FIG. 7 is intended as an example, and not as an architectural limitation for different embodiments of the present invention.

As will be appreciated by one skilled in the art, aspects of the exemplary embodiments may be embodied as a system, method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It has to be appreciated that while the invention has been particularly shown and described with reference to exemplary embodiments, various changes in form and detail may be made therein without departing from the spirit, and scope of the invention. Particularly, the "License Provisioning" module may also be coupled to a more general procurement system (not shown) which can purchase the required license(s) if they are not readily available from a free license pool.

We claim:

1. A computer implemented method of managing software licenses comprising the steps of:
    storing by an authentication and license checking module a plurality of software licenses and assigning the plurality of software licenses to a plurality of login user identifiers;
    requesting by an application server a login user identifier in response to receiving a request by a user to access a software resource on the application server;
    receiving by the application server the login user identifier;
    identifying by the application server at least one software license required to entitle access to the software resource;
    simultaneously providing the identified at least one software license and the received login user identifier to the authentication and license checking module;
    comparing by the authentication and license checking module the received login user identifier to stored login users identifiers to authenticate the user;
    comparing by the authentication and license checking module the identified at least one software license to the previously assigned and stored software licenses, each stored software license being previously assigned to one or more login user identifiers of the stored login user identifiers prior to comparing by the authentication and license checking module the identified at least one software license; and
    granting by the application server access to the software resource in response to retrieving within the stored software licenses the identified at least one software license previously assigned to the received login user identifier;
    wherein the method is performed on at least one computer processor.

2. The method of claim 1 wherein after the software license comparing step, further comprising the step of sending from the remote server an access authorization for the user.

3. The method of claim 1 wherein after the software license comparing step, further comprising the step of denying access to the user in response to not retrieving within the stored software licenses the at least one software license assigned to the received login user identifier.

4. The method of claim 1 wherein after the software license comparing step, further comprising the step of retrieving the at least one software license from a repository of non-assigned stored software licenses if the at least one software license is not retrieved from the assigned stored software licenses.

5. The method of claim 4 further comprising the step of assigning the retrieved non-assigned stored at least one software license to the received login user identifier.

6. The method of claim 4 wherein the repository of non-assigned stored software licenses is located on a second remote server.

7. The method of claim 6 wherein the second remote server is a license provisioning server.

8. A computer program product for managing software licenses, the computer program product comprising:
    a nontransitory computer readable storage medium having computer readable program code embodied therewith, the computer readable program code comprising:
    computer readable program code configured to have a remote server store a plurality of software licenses and assign the plurality of software license to a plurality of login user identifiers;
    computer readable program code configured to have an application server request a login user identifier in response to receiving a request by a user to access a software resource on the application server;
    computer readable program code configured to have the application server receive the login user identifier;
    computer readable program code configured to have the application server identify at least one software license required to entitle access to the software resource;
    computer readable program code configured to have the application server simultaneously provide the identified at least one software license and the received login user identifier to the remote server;
    computer readable program code configured to have the remote server compare the received login user identifier to stored login users identifiers to authenticate the user;
    computer readable program code configured to have the remote server compare the identified at least one software license to the previously assigned and stored software licenses, each stored software license being previously assigned to one or more login user identifiers of the stored login user identifiers prior to computer readable program code configured to have the remote server compare the identified at least one software license; and computer readable program code configured to grant access to the software resource in response to retrieving within the stored software licenses the identified at least one software license assigned to the received login user identifier.

9. The computer program product of claim 8 wherein after the computer readable program code configured to compare the at least one software license, further comprising computer readable program code configured to send from the remote server an access authorization for the user.

10. The computer program product of claim 8 wherein after the computer readable program code configured to compare the at least one software license, further comprising computer readable program code configured to deny access to the user in response to not retrieving within the stored software licenses the at least one software license assigned to the received login user identifier.

11. The computer program product of claim 8 wherein after the computer readable program code configured to compare the at least one software license, further comprising computer readable program code configured to retrieve the at least one software license from a repository of non-assigned stored software licenses if the at least one software license is not retrieved from the assigned stored software licenses.

12. The computer program product of claim 11 further comprising computer readable program code configured to assign the retrieved non-assigned stored at least one software license to the received login user identifier.

13. The computer program product of claim 11 wherein the repository of non-assigned stored software licenses is located on a second remote server.

14. A system for managing software licenses comprising:
an application server and an authentication and licensing checking module;
the application server for requesting a login user identifier in response to receiving a request by a user to access a software resource on the application server, receiving the login user identifier, identifying at least one software license required to entitle access to the software resource and simultaneously providing the identified at least one software license and the received login user identifier to the authentication and license checking module;
the authentication and licensing checking module for storing a plurality of software licenses and assigning the plurality of software licenses to a plurality of login user identifiers, comparing the received login user identifier to stored login users identifiers to authenticate the user, comparing the identified at least one software license to previously assigned and stored software licenses, each stored software license being previously assigned to one or more login user identifiers of the stored login user identifiers prior to comparing the identified at least one software license, and granting access to the software resource in response to retrieving within the stored software licenses the identified at least one software license previously assigned to the received login user identifier or denying access to the user in response to not retrieving within the stored software licenses the at least one software license assigned to the received login user identifier;
wherein the system is implemented on at least one computer processor.

15. The system of claim 14 further comprising:
a licensing provisioning module for retrieving the at least one software license from a repository of non-assigned stored software licenses if the at least one software license is not retrieved from the assigned stored software licenses and assigning the retrieved non-assigned stored at least one software license to the received login user identifier.

* * * * *